UNITED STATES PATENT OFFICE.

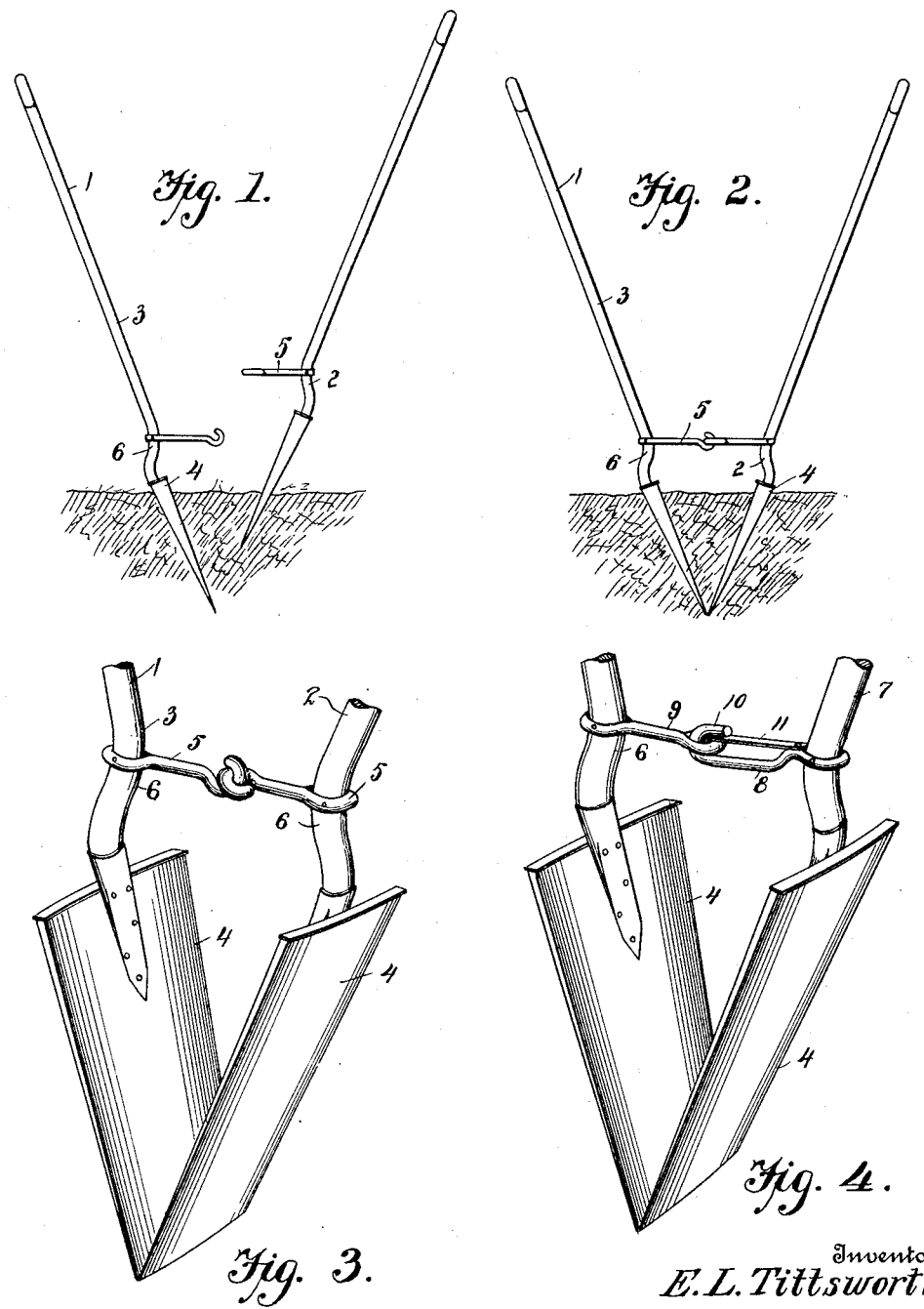

ELMER L. TITTSWORTH, OF NEW CANTON, ILLINOIS.

POST-HOLE DIGGER.

1,039,613.  Specification of Letters Patent.  Patented Sept. 24, 1912.

Application filed October 18, 1911. Serial No. 655,257.

*To all whom it may concern:*

Be it known that I, ELMER L. TITTSWORTH, a citizen of the United States, residing at New Canton, in the county of Pike and State of Illinois, have invented new and useful Improvements in Post-Hole Diggers, of which the following is a specification.

This invention relates to post hole diggers, the object of the invention being to provide relatively adjustable members which may be singly driven into the ground and then operatively fitted together to permit of their being simultaneously withdrawn from the ground and to collectively carry the earth therewith.

Another object of the invention is to provide such relatively adjustable members which can be readily separated from each other so that each may be used as a garden tool, such as a shovel.

In the drawing, forming a portion of this specification and in which like numerals of reference indicate similar parts in the several views:—Figure 1 is an edge view of the post hole digger showing one of the members fully inserted in the ground and the other member only partly inserted in the ground. Fig. 2 is a similar view showing both of the members fully inserted in the ground and illustrating their interfitting engagement with each other. Fig. 3 is a perspective view of the digger. Fig. 4 is a view similar to Fig. 3 showing a slightly modified form of my invention.

My improved post hole digger comprises relatively adjustable members 1 and 2 as shown in Figs. 1 to 3, inclusive, of the drawing. These members are of identical construction and each comprises a handle 3, a shovel or spade-like spoon or digging portion 4 and a hook member 5. The handles of the members are curved, at 6, and the hook members are preferably secured to such curved portions.

In use, the members are singly driven into the ground, as clearly illustrated in Fig. 1. The members are driven at an angle to each other and when both are fully inserted in the ground the hook members may be brought into interfitting engagement, whereupon, the members may be simultaneously or collectively withdrawn from the ground and disposed relatively so that the dirt receiving space which is defined by the spoon or shovel like portions of the members will retain the dirt until the members are fully withdrawn from the ground. When the members are fully withdrawn they may be moved relatively with their interfitting hook portions as a hinge and the dirt which has been withdrawn from the ground can be deposited at some desirable place.

In the modified form of the invention shown in Fig. 4, the relatively adjustable members 6 and 7 are provided with interfitting elements 9 and 8 respectively. The element 8 is of snap hook form, being provided with a suitable tongue 10 and a spring 11. The element 9 is of ring form and is designed to snap beneath the spring and to be operatively engaged with the tongue of the snap hook so that the tongue and ring respectively will be effectively interlocked.

I claim:

1. In a post hole digger comprising a pair of digging elements adapted to be driven independently into the ground, a hook member carried by one of the said elements and arranged at a right angle thereto, a second hook member carried by the other element and arranged at a right angle thereto, said second hook member being adapted to interlock with the first named hook member after the said second element is driven.

2. In a post hole digger comprising a pair of digging elements adapted to be driven independently into the ground, hook members carried by each of the said elements and disposed at right angles thereto, one of the said hook members being adapted to removably engage the other hook member when the second element has been driven in a relative position with the first element.

In testimony whereof I affix my signature in presence of two witnesses.

ELMER L. TITTSWORTH.

Witnesses:
 FRED TITTSWORTH,
 WILLIAM H. HOWARD.

Copies of this patent may be obtained for five cents each, by addressing the "Commissioner of Patents, Washington, D. C."